United States Patent
McGuire, Jr. et al.

(10) Patent No.: US 8,765,217 B2
(45) Date of Patent: Jul. 1, 2014

(54) METHOD FOR CONTINUOUS PRODUCTION OF (METH)ACRYLATE SYRUP AND ADHESIVES THEREFROM

(75) Inventors: James E. McGuire, Jr., Westerville, OH (US); Andrew C. Strange, Worthington, OH (US); Daniel E. Lamone, Dublin, OH (US)

(73) Assignee: entrotech, inc., Columbus, OH (US)

( * ) Notice: Subject to any disclaimer, the term of this patent is extended or adjusted under 35 U.S.C. 154(b) by 278 days.

(21) Appl. No.: 12/264,602

(22) Filed: Nov. 4, 2008

(65) Prior Publication Data

US 2010/0112201 A1    May 6, 2010

(51) Int. Cl.
*B05D 5/10* (2006.01)

(52) U.S. Cl.
USPC ........................... 427/207.1; 525/451

(58) Field of Classification Search
USPC ......... 427/207.1; 526/135, 146, 147; 525/451
See application file for complete search history.

(56) References Cited

U.S. PATENT DOCUMENTS

| | | |
|---|---|---|
| 3,154,141 A | 10/1964 | Huet |
| 3,252,950 A | 5/1966 | Terenzi et al. |
| 3,310,600 A | 3/1967 | Ziegler, Karl et al. |
| 3,399,227 A | 8/1968 | Tapulionis |
| 3,628,918 A | 12/1971 | Beals et al. |
| 3,728,085 A | 4/1973 | Horiguchi et al. |
| 3,776,947 A | 12/1973 | Shimizu et al. |
| 3,816,267 A | 6/1974 | Chuang |
| 3,821,330 A | 6/1974 | Free |
| 3,914,290 A | 10/1975 | Otsuki et al. |
| 4,009,195 A | 2/1977 | Leister et al. |
| 4,016,348 A | 4/1977 | Adams |
| 4,046,718 A | 9/1977 | Mass et al. |
| 4,089,918 A | 5/1978 | Kato et al. |
| 4,110,521 A | 8/1978 | Barnett et al. |
| 4,153,774 A | 5/1979 | Boettcher et al. |
| 4,173,719 A | 11/1979 | Tauber et al. |
| 4,181,752 A | 1/1980 | Martens et al. |
| 4,200,145 A | 4/1980 | Underwood |
| 4,233,267 A | 11/1980 | Coker et al. |
| 4,258,204 A | 3/1981 | Banks et al. |
| 4,280,009 A | 7/1981 | Erpenbach et al. |

(Continued)

FOREIGN PATENT DOCUMENTS

| | | |
|---|---|---|
| DE | 880938 | 6/1953 |
| DE | 4344358 | 7/1995 |

(Continued)

OTHER PUBLICATIONS

United States Occupational Safety & Health Administration, "Chemical Sampling Information: 2-Ethylhexyl acrylate," [online— retrieved Dec. 17, 2009 from http://www.osha.gov/dts/chemicalsampling/data/CH_240533.html]; Jun. 16, 1995.

*Primary Examiner* — Michael Cleveland
*Assistant Examiner* — Xiao Zhao
(74) *Attorney, Agent, or Firm* — The Griffith Law Firm, A P.C.; Lisa M. Griffith

(57) ABSTRACT

A method of preparing a (meth)acrylate syrup comprises: providing one or more precursors for formation of (meth)acrylate monomer; continuously forming the (meth)acrylate monomer from the one or more precursors thereof; and continuously polymerizing at least the (meth)acrylate monomer to form the (meth)acrylate syrup. The (meth)acrylate syrup is useful in, for example, preparation of adhesives.

33 Claims, 2 Drawing Sheets

(56) References Cited

U.S. PATENT DOCUMENTS

| | | |
|---|---|---|
| 4,280,010 A | 7/1981 | Erpenbach et al. |
| 4,287,317 A | 9/1981 | Kitagawa et al. |
| 4,303,485 A | 12/1981 | Levins |
| 4,329,384 A | 5/1982 | Vesley et al. |
| 4,329,492 A | 5/1982 | Andoh et al. |
| 4,330,590 A | 5/1982 | Vesley |
| 4,364,972 A | 12/1982 | Moon |
| 4,379,201 A | 4/1983 | Heilmann et al. |
| 4,383,093 A | 5/1983 | Shiraki et al. |
| 4,391,687 A | 7/1983 | Vesley |
| 4,395,525 A | 7/1983 | Fischer et al. |
| 4,396,675 A | 8/1983 | Groff |
| 4,402,914 A | 9/1983 | Eckhoff |
| 4,404,246 A | 9/1983 | Charbonneau et al. |
| 4,415,615 A | 11/1983 | Esmay et al. |
| 4,421,822 A | 12/1983 | Levins |
| 4,455,205 A | 6/1984 | Olson et al. |
| 4,478,876 A | 10/1984 | Chung |
| 4,480,116 A | 10/1984 | Clonce et al. |
| 4,513,039 A | 4/1985 | Esmay |
| 4,522,870 A | 6/1985 | Esmay |
| 4,554,324 A | 11/1985 | Husman et al. |
| 4,557,960 A | 12/1985 | Vernon et al. |
| 4,563,388 A | 1/1986 | Bonk et al. |
| RE32,249 E | 9/1986 | Esmay |
| 4,617,367 A | 10/1986 | Watanabe et al. |
| 4,619,867 A | 10/1986 | Charbonneau et al. |
| 4,619,979 A | 10/1986 | Kotnour et al. |
| 4,695,608 A | 9/1987 | Engler et al. |
| 4,699,843 A | 10/1987 | Charbonneau et al. |
| 4,731,273 A | 3/1988 | Bork et al. |
| 4,737,559 A | 4/1988 | Kellen et al. |
| 4,748,061 A | 5/1988 | Vesley |
| 4,766,023 A | 8/1988 | Lu |
| 4,777,230 A | 10/1988 | Kamath |
| 4,810,523 A | 3/1989 | William et al. |
| 4,818,610 A | 4/1989 | Zimmerman et al. |
| 4,840,756 A | 6/1989 | Ebersole et al. |
| 4,843,134 A | 6/1989 | Kotnour et al. |
| 4,847,137 A | 7/1989 | Kellen et al. |
| 4,931,347 A | 6/1990 | Slovinsky et al. |
| 4,942,001 A | 7/1990 | Murphy et al. |
| 4,950,537 A | 8/1990 | Vesley et al. |
| 4,959,265 A | 9/1990 | Wood et al. |
| 4,968,558 A | 11/1990 | Fisher et al. |
| 4,985,488 A | 1/1991 | Landin |
| 4,985,562 A | 1/1991 | Rossman et al. |
| 4,988,742 A | 1/1991 | Moon et al. |
| 4,996,029 A | 2/1991 | Martin et al. |
| 5,009,224 A | 4/1991 | Cole |
| 5,024,880 A | 6/1991 | Veasley et al. |
| 5,028,484 A | 7/1991 | Martin |
| 5,034,526 A | 7/1991 | Bonham et al. |
| 5,057,366 A | 10/1991 | Husman et al. |
| 5,089,536 A | 2/1992 | Palazzotto |
| 5,102,715 A | 4/1992 | Zetterquist |
| 5,106,560 A | 4/1992 | Duffy et al. |
| 5,135,981 A | 8/1992 | Matsumaru et al. |
| 5,147,698 A | 9/1992 | Cole |
| 5,147,938 A | 9/1992 | Kuller |
| 5,153,323 A | 10/1992 | Rossman et al. |
| 5,183,833 A | 2/1993 | Fisher et al. |
| 5,187,045 A | 2/1993 | Bonham et al. |
| 5,188,808 A | 2/1993 | Lilja et al. |
| 5,202,361 A | 4/1993 | Zimmerman et al. |
| 5,236,560 A | 8/1993 | Drysdale et al. |
| 5,237,355 A | 8/1993 | Kiehne et al. |
| 5,266,402 A | 11/1993 | Delgado et al. |
| 5,286,601 A | 2/1994 | Rossman et al. |
| 5,308,887 A | 5/1994 | Ko et al. |
| 5,344,691 A | 9/1994 | Hanschen et al. |
| 5,354,597 A | 10/1994 | Capik et al. |
| 5,354,600 A | 10/1994 | Fisher et al. |
| 5,371,560 A | 12/1994 | Kiehne et al. |
| 5,385,772 A | 1/1995 | Slovinsky et al. |
| 5,386,052 A | 1/1995 | Sakakura et al. |
| 5,387,682 A | 2/1995 | Bonham et al. |
| 5,391,406 A | 2/1995 | Ramharack et al. |
| 5,407,717 A | 4/1995 | Lucast et al. |
| 5,416,127 A | 5/1995 | Chandran et al. |
| 5,458,983 A | 10/1995 | Wang et al. |
| 5,462,797 A | 10/1995 | Williams et al. |
| 5,462,977 A | 10/1995 | Yoshikawa et al. |
| 5,464,659 A | 11/1995 | Melancon et al. |
| 5,468,821 A | 11/1995 | Lucast et al. |
| 5,496,504 A | 3/1996 | Bonham et al. |
| 5,501,679 A | 3/1996 | Krueger et al. |
| 5,514,730 A | 5/1996 | Mazurek et al. |
| 5,521,227 A | 5/1996 | Palazotto et al. |
| 5,521,229 A | 5/1996 | Lu et al. |
| 5,527,595 A | 6/1996 | Slovinsky et al. |
| 5,536,759 A | 7/1996 | Ramharack et al. |
| 5,559,163 A | 9/1996 | Dawson et al. |
| 5,568,210 A | 10/1996 | Kiehne et al. |
| 5,589,246 A | 12/1996 | Calhoun et al. |
| 5,593,795 A | 1/1997 | Chen et al. |
| 5,602,221 A | 2/1997 | Bennett et al. |
| 5,616,670 A | 4/1997 | Bennett et al. |
| 5,620,795 A | 4/1997 | Haak et al. |
| 5,623,000 A | 4/1997 | Yoshikawa et al. |
| 5,624,763 A | 4/1997 | Melancon et al. |
| 5,624,973 A | 4/1997 | Lu et al. |
| 5,637,395 A | 6/1997 | Uemura et al. |
| 5,637,646 A | 6/1997 | Ellis |
| 5,641,544 A | 6/1997 | Melancon et al. |
| 5,643,648 A | 7/1997 | Kobe et al. |
| 5,643,668 A | 7/1997 | Calhoun et al. |
| 5,650,215 A | 7/1997 | Mazurek et al. |
| 5,654,387 A | 8/1997 | Bennett et al. |
| 5,658,630 A | 8/1997 | Shizukuda et al. |
| 5,660,925 A | 8/1997 | Cooley et al. |
| 5,667,893 A | 9/1997 | Kinzer et al. |
| 5,670,260 A | 9/1997 | Zajaczkowski et al. |
| 5,670,557 A | 9/1997 | Dietz et al. |
| 5,674,561 A | 10/1997 | Dietz et al. |
| 5,679,756 A | 10/1997 | Zhu et al. |
| 5,683,798 A | 11/1997 | Bennett et al. |
| 5,686,504 A | 11/1997 | Ang |
| 5,691,034 A | 11/1997 | Krueger et al. |
| 5,695,837 A | 12/1997 | Everaerts et al. |
| 5,702,771 A | 12/1997 | Shipston et al. |
| 5,708,109 A | 1/1998 | Bennett et al. |
| 5,708,110 A | 1/1998 | Bennett et al. |
| 5,710,227 A | 1/1998 | Freeman et al. |
| 5,725,947 A | 3/1998 | Johannson et al. |
| 5,726,258 A | 3/1998 | Fischer et al. |
| 5,728,502 A | 3/1998 | Ou-Yang et al. |
| 5,734,074 A | 3/1998 | Dockner et al. |
| 5,741,542 A | 4/1998 | Williams et al. |
| 5,741,543 A | 4/1998 | Winslow et al. |
| 5,753,362 A | 5/1998 | Kawase et al. |
| 5,753,768 A | 5/1998 | Ellis |
| 5,756,584 A | 5/1998 | Bennett et al. |
| 5,770,219 A | 6/1998 | Chiang et al. |
| 5,773,485 A | 6/1998 | Bennett et al. |
| 5,779,632 A | 7/1998 | Dietz et al. |
| 5,800,685 A | 9/1998 | Perrault |
| 5,804,610 A | 9/1998 | Hamer et al. |
| 5,811,574 A | 9/1998 | Exner et al. |
| 5,840,783 A | 11/1998 | Momchilovich et al. |
| 5,848,769 A | 12/1998 | Fronek et al. |
| 5,853,642 A | 12/1998 | Siedle et al. |
| 5,853,750 A | 12/1998 | Dietz et al. |
| 5,858,516 A | 1/1999 | Ou-Yang |
| 5,859,088 A | 1/1999 | Peterson et al. |
| 5,871,607 A | 2/1999 | Hamilton et al. |
| 5,879,759 A | 3/1999 | Zang |
| 5,883,149 A | 3/1999 | Bennett et al. |
| 5,883,288 A | 3/1999 | Iffland et al. |
| 5,900,125 A | 5/1999 | Exner et al. |
| 5,902,836 A | 5/1999 | Bennett et al. |
| 5,919,603 A | 7/1999 | Miyazaki et al. |
| 5,932,298 A | 8/1999 | Moon et al. |
| 5,942,642 A | 8/1999 | Beyer et al. |

(56) References Cited

U.S. PATENT DOCUMENTS

| | | | |
|---|---|---|---|
| 5,945,560 A | 8/1999 | Iffland et al. |
| 5,952,398 A | 9/1999 | Dietz et al. |
| 5,965,235 A | 10/1999 | McGuire et al. |
| 5,968,633 A | 10/1999 | Hamilton et al. |
| 5,969,069 A | 10/1999 | Su et al. |
| 5,976,690 A | 11/1999 | Williams et al. |
| 5,980,932 A | 11/1999 | Chiang et al. |
| 5,986,011 A | 11/1999 | Ellis |
| 6,015,603 A | 1/2000 | Ou-Yang |
| 6,030,701 A | 2/2000 | Johnson et al. |
| 6,034,263 A | 3/2000 | Rizzardo et al. |
| 6,037,430 A | 3/2000 | Chiang |
| 6,045,920 A | 4/2000 | Ou-Yang et al. |
| 6,072,076 A | 6/2000 | Schmidt et al. |
| 6,084,122 A | 7/2000 | Garza et al. |
| 6,099,940 A | 8/2000 | Hamilton et al. |
| 6,103,316 A | 8/2000 | Tran et al. |
| 6,123,890 A | 9/2000 | Mazurek et al. |
| 6,124,417 A | 9/2000 | Su |
| 6,126,865 A | 10/2000 | Haak et al. |
| 6,132,844 A | 10/2000 | Altshuler et al. |
| 6,148,496 A | 11/2000 | McGuire et al. |
| 6,149,935 A | 11/2000 | Chiang et al. |
| 6,150,486 A | 11/2000 | Schwede et al. |
| 6,159,557 A | 12/2000 | Meyer-Roscher et al. |
| 6,168,682 B1 | 1/2001 | Bennett et al. |
| 6,172,170 B1 | 1/2001 | Koniger et al. |
| 6,174,931 B1 | 1/2001 | Moon et al. |
| 6,177,190 B1 | 1/2001 | Gehlsen et al. |
| 6,187,127 B1 | 2/2001 | Bolitsky et al. |
| 6,193,918 B1 | 2/2001 | McGuire et al. |
| 6,194,062 B1 | 2/2001 | Hamilton et al. |
| 6,214,460 B1 | 4/2001 | Bluem et al. |
| 6,217,965 B1 | 4/2001 | Gelbart |
| 6,228,449 B1 | 5/2001 | Meyer |
| 6,232,365 B1 | 5/2001 | Weiss et al. |
| 6,241,928 B1 | 6/2001 | Hatsuda et al. |
| 6,242,504 B1 | 6/2001 | Meyer-Roscher et al. |
| 6,245,922 B1 | 6/2001 | Heilmann et al. |
| 6,252,016 B1 | 6/2001 | Wu et al. |
| 6,254,965 B1 | 7/2001 | McGuire et al. |
| 6,262,329 B1 | 7/2001 | Brunsveld et al. |
| 6,280,822 B1 | 8/2001 | Smith et al. |
| 6,284,360 B1 | 9/2001 | Johnson et al. |
| 6,287,685 B1 | 9/2001 | Janssen et al. |
| 6,294,249 B1 | 9/2001 | Hamer et al. |
| 6,315,851 B1 | 11/2001 | Mazurek et al. |
| 6,316,099 B1 | 11/2001 | George et al. |
| 6,326,450 B1 | 12/2001 | Shipston et al. |
| 6,339,111 B1 | 1/2002 | Moon et al. |
| 6,340,719 B1 | 1/2002 | Goeb et al. |
| 6,348,249 B2 | 2/2002 | Meyer |
| 6,353,130 B1 | 3/2002 | Aichinger et al. |
| 6,372,827 B2 | 4/2002 | Johnson et al. |
| 6,383,958 B1 | 5/2002 | Swanson et al. |
| 6,399,031 B1 | 6/2002 | Herrmann et al. |
| 6,406,782 B2 | 6/2002 | Johnson et al. |
| 6,413,629 B1 | 7/2002 | Kimura |
| 6,414,087 B1 | 7/2002 | Hashemzadeh et al. |
| 6,416,838 B1 | 7/2002 | Arney et al. |
| 6,421,052 B1 | 7/2002 | McGuire |
| 6,436,529 B1 | 8/2002 | Deeb et al. |
| 6,436,532 B1 | 8/2002 | Moon et al. |
| 6,440,880 B2 | 8/2002 | Mazurek et al. |
| 6,441,092 B1 | 8/2002 | Gieselman |
| 6,444,305 B2 | 9/2002 | Banovetz et al. |
| 6,448,301 B1 | 9/2002 | Gaddam et al. |
| 6,448,337 B1 | 9/2002 | Gaddam et al. |
| 6,448,339 B1 | 9/2002 | Tomita |
| 6,455,140 B1 | 9/2002 | Whitney et al. |
| 6,458,454 B1 | 10/2002 | Kreckel |
| 6,469,118 B1 | 10/2002 | Su |
| 6,475,609 B1 | 11/2002 | Whitney et al. |
| 6,485,589 B1 | 11/2002 | Johnson et al. |
| 6,489,022 B1 | 12/2002 | Hamilton et al. |
| 6,492,019 B1 | 12/2002 | Shipston et al. |
| 6,495,253 B1 | 12/2002 | Koyama et al. |
| 6,497,949 B1 | 12/2002 | Hyde et al. |
| 6,503,621 B1 | 1/2003 | Ma et al. |
| 6,513,897 B2 | 2/2003 | Tokie |
| 6,514,373 B1 | 2/2003 | Hil, IV et al. |
| 6,517,661 B1 | 2/2003 | Hill, IV et al. |
| 6,517,910 B2 | 2/2003 | Wright et al. |
| 6,518,343 B1 | 2/2003 | Lucast et al. |
| 6,524,649 B1 | 2/2003 | Sher et al. |
| 6,537,659 B2 | 3/2003 | Karim et al. |
| 6,551,439 B1 | 4/2003 | Hill, IV et al. |
| 6,566,549 B1 | 5/2003 | Greenblatt et al. |
| 6,579,915 B2 | 6/2003 | Kroll et al. |
| 6,586,082 B1 | 7/2003 | Brown |
| 6,599,602 B2 | 7/2003 | Bennett et al. |
| 6,602,454 B2 | 8/2003 | McGuire et al. |
| 6,602,580 B1 | 8/2003 | Hamilton et al. |
| 6,605,738 B1 | 8/2003 | Ho et al. |
| 6,613,411 B2 | 9/2003 | Kollaja et al. |
| 6,624,273 B1 | 9/2003 | Everaerts et al. |
| 6,632,907 B1 * | 10/2003 | Mizota et al. .................. 526/319 |
| 6,635,690 B2 | 10/2003 | Heilmann et al. |
| 6,649,787 B1 | 11/2003 | Nakahara et al. |
| 6,652,970 B1 | 11/2003 | Everaerts et al. |
| 6,656,307 B2 | 12/2003 | Northey |
| 6,664,306 B2 | 12/2003 | Gaddam et al. |
| 6,677,402 B2 | 1/2004 | Gaddam et al. |
| 6,689,853 B2 | 2/2004 | Campbell et al. |
| 6,740,399 B1 | 5/2004 | George et al. |
| 6,759,110 B1 | 7/2004 | Fleming et al. |
| 6,768,021 B2 | 7/2004 | Horan et al. |
| 6,773,647 B2 | 8/2004 | McGuire et al. |
| 6,800,278 B1 | 10/2004 | Perrault et al. |
| 6,803,072 B2 | 10/2004 | Sher et al. |
| 6,815,035 B2 | 11/2004 | Bennett et al. |
| 6,818,292 B2 | 11/2004 | Hamilton et al. |
| 6,825,278 B2 | 11/2004 | Holub et al. |
| 6,828,363 B2 | 12/2004 | Beuermann et al. |
| 6,838,142 B2 | 1/2005 | Yang et al. |
| 6,841,234 B2 | 1/2005 | Lhila et al. |
| 6,846,948 B2 | 1/2005 | Riondel et al. |
| 6,855,226 B2 | 2/2005 | Hill, IV et al. |
| 6,855,386 B1 | 2/2005 | Daniels et al. |
| 6,858,295 B2 | 2/2005 | Diehl et al. |
| 6,864,322 B2 | 3/2005 | Gehlsen et al. |
| 6,866,899 B2 | 3/2005 | Wright |
| 6,872,342 B2 | 3/2005 | Giachetto et al. |
| 6,878,440 B1 | 4/2005 | Yamanaka et al. |
| 6,881,471 B2 | 4/2005 | Toussant et al. |
| 6,883,908 B2 | 4/2005 | Young et al. |
| 6,893,655 B2 | 5/2005 | Flanigan et al. |
| 6,903,151 B2 | 6/2005 | Lucast et al. |
| 6,903,243 B1 | 6/2005 | Burton et al. |
| 6,906,164 B2 | 6/2005 | DeBruin |
| 6,911,243 B2 | 6/2005 | Sher et al. |
| 6,926,959 B2 | 8/2005 | Kroll et al. |
| 6,939,428 B2 | 9/2005 | Hill, IV et al. |
| 6,982,107 B1 | 1/2006 | Hennen |
| 7,015,286 B2 | 3/2006 | Heilmann et al. |
| 7,015,295 B1 | 3/2006 | Takizawa et al. |
| 7,056,984 B2 | 6/2006 | Kawabata et al. |
| 7,074,295 B2 | 7/2006 | Bellafore et al. |
| 7,074,858 B2 | 7/2006 | Heilmann et al. |
| 7,087,279 B2 | 8/2006 | Callahan et al. |
| 7,105,206 B1 | 9/2006 | Beck et al. |
| 7,119,128 B2 | 10/2006 | Husemann et al. |
| 7,182,829 B2 | 2/2007 | Smith et al. |
| 7,217,455 B2 | 5/2007 | Valdez |
| 7,229,517 B2 | 6/2007 | Bellafore et al. |
| 7,244,863 B2 | 7/2007 | Yada et al. |
| 7,250,210 B2 | 7/2007 | Mazurek et al. |
| 7,276,278 B2 | 10/2007 | Kamiyama et al. |
| 7,300,555 B2 | 11/2007 | Schroeder |
| 7,332,206 B2 | 2/2008 | Callahan et al. |
| 7,345,139 B2 | 3/2008 | DeBruin |
| 7,691,437 B2 * | 4/2010 | Ellis et al. .................. 427/207.1 |
| 2001/0053814 A1 * | 12/2001 | Yamamoto et al. ........... 524/560 |
| 2002/0007030 A1 * | 1/2002 | Brant ........................ 526/282 |

(56) References Cited

U.S. PATENT DOCUMENTS

| | | |
|---|---|---|
| 2002/0077509 A1* | 6/2002 | Sugise et al. .................. 568/341 |
| 2003/0153699 A1* | 8/2003 | Ameduri et al. .............. 526/243 |
| 2003/0199669 A1* | 10/2003 | Saito et al. .................... 528/393 |
| 2004/0077744 A1 | 4/2004 | Naylor et al. |
| 2004/0176561 A1* | 9/2004 | Janeiro ........................... 528/12 |
| 2004/0192991 A1* | 9/2004 | Lattner et al. ................. 585/638 |
| 2005/0107629 A1 | 5/2005 | Hershberger et al. |
| 2006/0036047 A1 | 2/2006 | Klostermann et al. |
| 2006/0205972 A1 | 9/2006 | Clymo et al. |
| 2007/0112154 A1 | 5/2007 | Lee et al. |
| 2007/0129512 A1 | 6/2007 | Blitz et al. |
| 2007/0299226 A1 | 12/2007 | Park et al. |
| 2010/0113692 A1 | 5/2010 | McGuire et al. |
| 2010/0267855 A1 | 10/2010 | McGuire, Jr. |

FOREIGN PATENT DOCUMENTS

| | | |
|---|---|---|
| DE | 10036879 | 9/2001 |
| DE | 10063510 | 7/2002 |
| EP | 0795535 | 9/1997 |
| EP | 0795536 | 9/1997 |
| EP | 0 891 990 | 1/1999 |
| GB | 1352400 | 5/1974 |
| GB | 2159826 | 12/1985 |
| JP | 2001-106654 | 4/2001 |
| JP | 2001-131116 | 5/2001 |
| JP | 2005-230585 | 9/2005 |
| WO | WO-98/52904 | 11/1998 |
| WO | WO-02/092639 | 11/2002 |
| WO | WO-2006/020787 | 2/2006 |

* cited by examiner

METHOD FOR CONTINUOUS PRODUCTION OF (METH)ACRYLATE SYRUP AND ADHESIVES THEREFROM

BACKGROUND OF THE INVENTION

The present invention relates generally to a method for continuous production of (meth)acrylate syrup and (meth)acrylate-based adhesives therefrom.

Adhesives are provided in various forms for application. For example, adhesives can be prepared and provided in organic solvent for application, after which time the solvent is removed. Adhesives can also be prepared and applied without use of organic solvent—e.g., as in the case of hot-melt adhesives (i.e., where the adhesive is substantially polymerized prior to its application to a substrate) or web-polymerized adhesives (i.e., where the adhesive is substantially polymerized after its application to a substrate). Hot-melt adhesives have a sufficient viscosity upon melting, such that they can be applied to a substrate. Yet, some method of increasing the cohesive strength of applied hot-melt adhesives is often needed (e.g., post-crosslinking or moisture-curing), resulting in decreased processing efficiency and other limitations.

In addition to their various forms, adhesives are used in a variety of applications and are based on a variety of chemistries, which are often dictated by the nature of the desired application. For example, adhesives based on (meth)acrylate chemistry are commonplace, particularly when viscoelastic adhesive properties are desired.

Conventionally, (meth)acrylate-based adhesives are prepared starting with stock (meth)acrylate monomer that is formed according to known methods (e.g., an esterification reaction between an oxo alcohol and (meth)acrylic acid such as that described in U.S. Pat. Nos. 3,776,947; 4,280,009; and 5,386,052). Methods relying on an esterification reaction typically include use of elevated temperatures, reduced pressure, (meth)acrylic acid, an acid catalyst, a molar excess of one component—typically oxo alcohol, and distillation to purify the resulting (meth)acrylate monomer.

Once prepared, processing is generally discontinued and stock (meth)acrylate monomers are stored for later use. Often, polymerization inhibitors (e.g., quinone-based polymerization inhibitors) are present in stock (meth)acrylate monomer in order to prevent premature polymerization thereof during this typical processing delay. An example of the use of quinone-based polymerization inhibitors for this purpose is described in U.S. Pat. No. 3,816,267. Quinone-based polymerization inhibitors are commonly employed, and they can be deactivated by removing oxygen from the system in which they are used (e.g., by purging the system with nitrogen prior to polymerization of the monomer). Thus, special storage and handling conditions are generally associated with stock (meth)acrylate monomer prior to its polymerization.

From compositions comprising stock (meth)acrylate monomer and any other types of monomers and components desired in an adhesive prepared therefrom, adhesives can be prepared using batch or continuous processes. Known continuous processes for preparation of web-polymerized adhesives involve coating of partially polymerized syrup onto a moving web, such as those processes described in U.S. Pat. Nos. 4,181,752; 4,303,485; 4,421,822; and 5,462,977. When continuously preparing (meth)acrylate-based web-polymerized adhesives, it is conventional to form a syrup having a coatable viscosity and based on stock (meth)acrylate monomer. As described in U.S. Pat. No. 4,303,485, that syrup can be conventionally prepared by supplying ultraviolet radiation to a container including stock (meth)acrylate monomer to partially polymerize the same. The step of partial photopolymerization is stopped at any point simply by turning off the ultraviolet radiation. That syrup can then be stored, if necessary, until a point in time that it is used to form an adhesive. When forming an adhesive, for example, the syrup can be coated onto a moving web, for example, where further polymerization thereof can be initiated to form the adhesive.

U.S. Pat. No. 4,303,485 describes a method for producing partially polymerized (meth)acrylate syrup utilizing photopolymerization techniques. The syrup is partially polymerized to a coatable viscosity. In producing the coatable syrup, (meth)acrylate monomer—in the presence of a photoinitiator—is irradiated with ultraviolet radiation for less than about one minute, creating a (meth)acrylate syrup having a viscosity of 0.3-10 Pascal-seconds (300-10,000 centipoise) at ordinary room temperature. The coatable syrup is stated to be a viable article of commerce in that it can be stored for later coating and exposure to ultraviolet radiation in order to convert the coating to its desired end use (e.g., a pressure sensitive adhesive tape).

In contrast to continuous web-polymerized methods, conventional methods of batch polymerization of adhesives and methods of continuous production of hot-melt type adhesives typically involve running of an initial polymerization reaction to at least near complete conversion, and often complete conversion, of the monomer to polymer. In both cases, the adhesive is substantially polymerized prior to its application to a substrate as compared to web-polymerized adhesives (i.e., where the adhesive is substantially polymerized after its application to a substrate).

Limitations of hot-melt processing methods and resulting adhesives are known to those of ordinary skill in the art. Limitations associated with batch processing methods, which often utilize solvents (i.e., water or organic solvents), are also known to those of ordinary skill in the art. Notably, use of solvents with batch processing methods, particularly organic solvents, is undesirable from an environmental, safety, and economic standpoint and is becomingly increasingly more so with time. For example, solvent-based batch polymerization of (meth)acrylates typically requires use of large and costly processing equipment in order to safely dissipate heat arising from the exothermic polymerization reaction. In addition, solvents used during the polymerization reaction must then typically be removed from the polymerized composition. This removal process undesirably increases processing time and cost and poses environmental challenges.

In view of environmental and safety concerns as well as the ever-present desire to optimize production efficiency, alternative methods for production of adhesives and intermediates thereof are desirable. Particularly desired are alternative methods for the continuous production of (meth)acrylate-based web-polymerized adhesives and their intermediates.

BRIEF SUMMARY OF THE INVENTION

The present invention is directed toward a method of preparing a (meth)acrylate syrup comprising: providing one or more precursors for formation of (meth)acrylate monomer; continuously forming the (meth)acrylate monomer from the one or more precursors thereof; and continuously polymerizing at least the (meth)acrylate monomer to form the (meth)acrylate syrup. Advantageously, methods of the invention impart process efficiencies not previously obtained due to the continuous nature of the multiple steps in the method.

The step of continuously forming the (meth)acrylate monomer can comprise reacting a (meth)acryloyl chloride and its corresponding oxo alcohol or esterification of (meth) acrylic acid and its corresponding oxo alcohol. For example, esterification can occur at an elevated temperature in the presence of at least one organic sulfonic acid catalyst. In a preferred embodiment, the oxo alcohol comprises a chain of at least six carbon atoms.

In a preferred embodiment, the (meth)acrylate monomer continuously formed has an atmospheric boiling temperature of at least about 140° C. After its formation, and prior to polymerization thereof, the (meth)acrylate monomer can optionally be purified.

In one embodiment, the (meth)acrylate monomer is continuously polymerized to form a homopolymeric (meth)acrylate syrup. In another embodiment, the (meth)acrylate monomer is continuously polymerized to form a co-polymeric (meth)acrylate syrup. That is, the step of continuously polymerizing at least the (meth)acrylate monomer to form the (meth)acrylate syrup comprises polymerizing at least one continuously formed (meth)acrylate monomer and at least one other type of monomer.

In an exemplary embodiment, continuous polymerization of at least the (meth)acrylate monomer is halted prior to near complete conversion of the (meth)acrylate monomer. In a further embodiment, continuous polymerization of at least the (meth)acrylate monomer is halted at a point corresponding to about 5% to about 25% conversion of the (meth)acrylate monomer.

Environmental and safety benefits, as well as processing efficiencies, are made possible by exemplary methods of the invention. For example, in one embodiment, continuously polymerizing at least the (meth)acrylate monomer is an essentially solvent-free process. In another embodiment, continuous polymerization of at least the (meth)acrylate monomer is capable of efficiently proceeding at temperatures of less than about 150° C. In yet another embodiment, continuously polymerizing at least the (meth)acrylate monomer occurs with a maximum reaction temperature of less than atmospheric boiling point of the (meth)acrylate monomer being polymerized to a syrup by at least about 30° C. In a further embodiment, continuously polymerizing at least the (meth)acrylate monomer occurs with a maximum reaction temperature of less than atmospheric boiling point of the (meth)acrylate monomer being polymerized to a syrup by at least about 50° C. In still another embodiment, continuously polymerizing at least the (meth)acrylate monomer comprises using a polymerization initiator having a half life of about ten hours or less at a use temperature of about 70° C. or less. In another embodiment, continuously polymerizing at least the (meth)acrylate monomer occurs within a heated portion of a polymerization reactor and with a residence time therein of less than about thirty minutes. In a further embodiment, continuously polymerizing at least the (meth)acrylate monomer occurs within a heated portion of a polymerization reactor and with a residence time therein of less than about five minutes. In still another embodiment, continuously polymerizing at least the (meth)acrylate monomer occurs within a heated portion of a polymerization reactor and wherein less than about 10% of continuous volumetric throughput is present within the heated portion of the polymerization reactor at any given time.

Methods of the invention also include methods of further processing the (meth)acrylate syrup so formed. An exemplary method of preparing an adhesive film comprises: preparing a (meth)acrylate syrup according to the invention; continuously coating a composition comprising the (meth)acrylate onto a substrate; and polymerizing the composition comprising the (meth)acrylate syrup to form the adhesive film. While any suitable mechanism can be used, in one exemplary embodiment, polymerizing the composition comprises free radical polymerization.

DETAILED DESCRIPTION OF THE INVENTION

Figure 1:
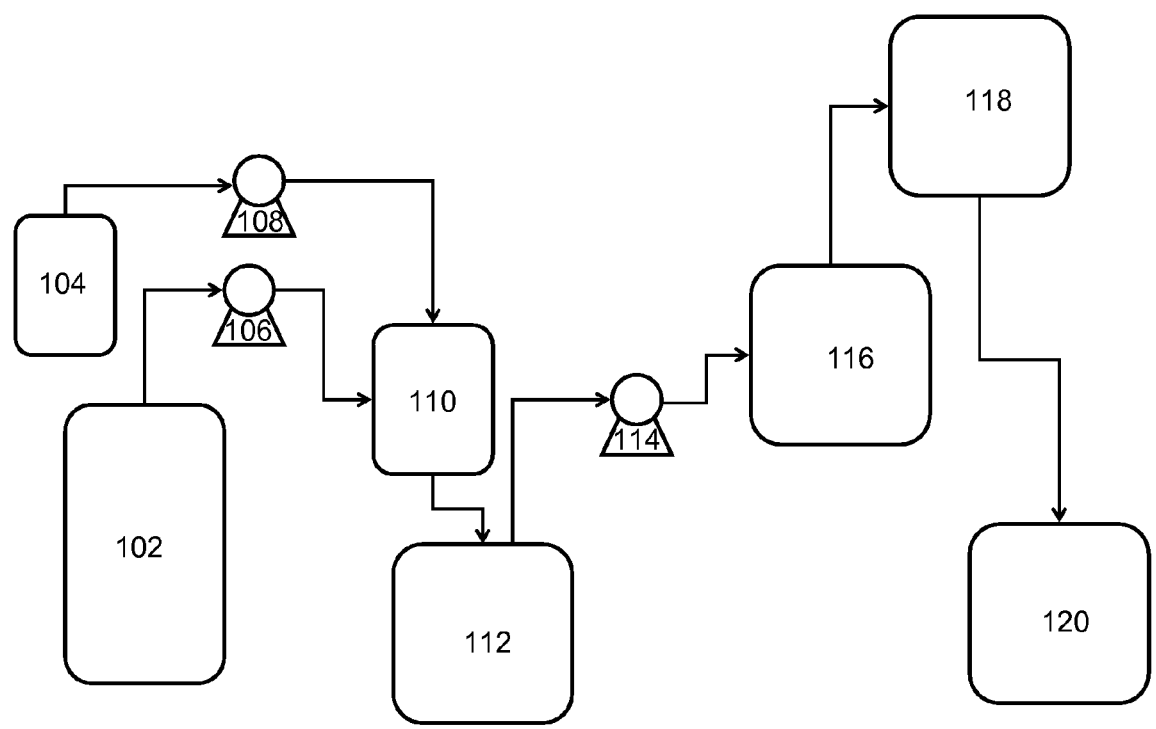
FIG. 1 is a schematic representation of exemplary processing steps including a stage of partial polymerization of (meth) acrylate monomer to a syrup in accordance with methods of the invention.

The present invention relates to a method of preparing (meth)acrylate syrup via a continuous process, beginning with preparation of (meth)acrylate monomer through partial polymerization of the (meth)acrylate monomer, and optionally other monomer, to a syrup thereof.

The present specification makes reference to terms that are described below for convenience of the reader.

As used herein, "(meth)acrylate" refers to both methacrylate and acrylate.

As used herein, "(meth)acrylic acid" refers to both methacrylic acid and acrylic acid.

As used herein, "(meth)acryloyl chloride" refers to both methacryloyl chloride and acryloyl chloride.

As used herein, "continuous" refers to a process that is essentially uninterrupted in time and space from a beginning reference point to an ending reference point. Continuous processes of the invention have a beginning reference point preceding formation of (meth)acrylate monomer and an ending reference point that is no earlier in the process than the point at which (meth)acrylate syrup is formed therefrom.

As used herein, "(meth)acrylate syrup" refers to a partially polymerized composition comprising a mixture of at least one (meth)acrylate monomer, optionally other monomer(s), and the polymerization product thereof. In one embodiment, a syrup comprises a mixture where about 70% or less of the (meth)acrylate monomer is polymerized based on molar weight of the monomer.

As used herein, "complete conversion" means about 100% of the stoichiometric amount of reactants are reacted, or converted, into their reaction product. This percentage of available reactants does not include amounts exceeding stoichiometric quantities of any of the reactants necessary to produce the (meth)acrylate polymer under the reaction conditions.

As used herein, "near complete conversion" means at least about 90% of the stoichiometric amount of reactants are reacted, or converted, into their reaction product. This percentage of available reactants does not include amounts exceeding stoichiometric quantities of any of the reactants necessary to produce the (meth)acrylate polymer under the reaction conditions.

As used herein, "essentially solvent-free" refers to compositions and associated methods comprising no more than about 5% organic solvents or water, more typically no more than about 3% organic solvents or water. Most typically, such systems are completely free of organic solvents and water.

Unlike conventional methods of (meth)acrylate polymerization premised on use of stock (meth)acrylate monomers, methods of the invention are continuous processes beginning with formation of at least one (meth)acrylate monomer from precursors thereof. Any suitable chemistries and associated precursors can be used to form the (meth)acrylate monomer or combinations thereof. Processes for formation of continuous (meth)acrylate monomer according to the invention are adapted according to the chemistry and associated reaction mechanism.

Any suitable reaction mechanism can be used to continuously prepare (meth)acrylate monomer according to the invention. An exemplary process for formation of (meth)acrylate monomer according to the invention comprises esterification of (meth)acrylic acid and its corresponding oxo alcohol. Another exemplary process for formation of (meth)acrylate monomer according to the invention comprises reacting (meth)acryloyl chloride and its corresponding oxo alcohol.

Preparation of oxo alcohols or commercial sources of their availability and other precursors to (meth)acrylate monomer is well known to those of ordinary skill in the art. In an exemplary embodiment, oxo alcohols used in accordance with the invention are aliphatic in nature. Key oxo alcohols sold in commerce include, for example, the following: 2-ethylhexanol, iso-nonyl alcohol, and iso-decyl alcohol. Key manufacturers of oxo alcohols include the following exemplary companies: BASF, Dow Chemical Company, Eastman Chemical Company, and ExxonMobil Chemical Company.

Oxo alcohols used according to exemplary methods of the invention comprise a chain of at least six carbon atoms. The use of oxo alcohols comprising such a longer carbon chain results in (meth)acrylate monomers having atmospheric boiling temperatures of at least about 140° C., preferably at least about 200° C. Further, such (meth)acrylate monomers facilitate effective polymerization thereof at relatively low pressures (e.g., about 5 MPa or less)—an important safety and cost factor. Preferred (meth)acrylate monomers derived for use according to methods of the invention include, for example, hexyl acrylate, n-octyl acrylate, iso-octyl acrylate, 2-ethylhexyl acrylate, iso-nonyl acrylate, decyl acrylate, and dodecyl acrylate.

For optimum efficiency according to an exemplary embodiment, esterification to form (meth)acrylate monomer occurs at an elevated temperature in the presence of a suitable catalyst. Without limitation, elevated temperatures of at least about 60° C. are generally used for esterification. Similarly, without limitation, temperatures of about 140° C. or less are generally used for esterification according to exemplary embodiments of the invention. Exemplary catalysts include organic sulfonic acids, such as sulfuric acid, p-toluenesulfonic acid, and methanesulfonic acid.

The reaction components (e.g., (meth)acrylic acid, oxo alcohol, and catalyst) are provided in suitable quantities and proportions. In one embodiment, one (meth)acrylic acid, one oxo alcohol, and one catalyst are reacted to form the (meth)acrylate monomer. In further embodiments, more than one type of at least one of those components is present during the reaction. Given that the reaction between an oxo alcohol and (meth)acrylic acid is an esterification reaction strongly driven by equilibrium, preferably a molar excess of oxo alcohol is present in relation to the amount of (meth)acrylic acid. This facilitates formation of the ensuing (meth)acrylate monomer as described in, for example, U.S. Pat. No. 5,386,052.

Once formed, the (meth)acrylate monomer can be purified prior to partial polymerization thereof to a syrup. It is to be understood, however, that when purification is desired it may occur during partial polymerization of the (meth)acrylate monomer to a syrup as opposed to a point in time prior thereto. A by-product of the esterification reaction of (meth)acrylic acid and oxo alcohol is water. Not only can water be removed during the purification stage of the process in preferred embodiments, but excess reactants can also separated from the resulting (meth)acrylate monomer during the purification stage. Any suitable purification methodology and equipment can be utilized during this stage.

Often polymerization inhibitors are present with commercially available (meth)acrylic acid used to form (meth)acrylate monomer according to methods of the invention. Many such polymerization inhibitors are effective as inhibitors only in the presence of oxygen. Thus, in addition to optional purification, when polymerization inhibitors such as those based on quinone chemistry (e.g., mono ether hydroquinone) are present with the (meth)acrylate monomer, purging oxygen from or otherwise limiting the effects of oxygen within the system is generally necessary to offset effects of such polymerization inhibitors (i.e., de-activate the polymerization inhibitors) and proceed to at least partially polymerize the (meth)acrylate monomer according to continuous methods of the invention. This can be done prior to or during partial polymerization of the (meth)acrylate monomer to a syrup.

In an exemplary embodiment, polymerization systems of the invention are closed to atmospheric air. Thus, no additional oxygen enters such a system. When desired, oxygen can be purged from a closed system as known to those of ordinary skill in the art. No matter what optional method is used to de-activate any polymerization inhibitors present, once the (meth)acrylate syrup is formed, the syrup can optionally be exposed to atmospheric oxygen to re-activate any polymerization inhibitors that are present and/or additional polymerization inhibitors can be added once the (meth)acrylate syrup is formed, essentially preventing further and/or complete polymerization until a point in time that it may be desired.

According to methods of the invention, once (meth)acrylate monomer is formed, it is continuously polymerized to form the (meth)acrylate syrup. The (meth)acrylate monomer can, optionally, be continuously polymerized with one or more other types of monomers to form the (meth)acrylate syrup. A wide variety of other types of monomers can be suitably polymerized with the (meth)acrylate monomer as desired. For example, other types of monomers can be selected to impart specific performance characteristics (e.g., specific adhesion, chemical resistance, etc.) in the intended application for the (meth)acrylate syrup or polymers therefrom. In one embodiment, one or more other types of monomers are polymerized with the (meth)acrylate monomer to become a pendent member of the polymeric syrup backbone. Preferably, other such monomers have an atmospheric boiling point of at least 140° C. It is also preferred that the other types of monomers comprise vinyl functional groups. The other types of monomers need not be continuously formed, but they can be if desired.

In contrast to conventional batch polymerization techniques, polymerization of the (meth)acrylate monomer during the continuous process of the invention does not proceed to complete conversion when forming a coatable (meth)acrylate syrup. During this stage of the process, the polymerization reaction is halted at a point prior to complete conversion, and even at a point prior to near complete conversion, of the (meth)acrylate monomer. Preferably, the polymerization reaction is halted at a point prior to 90% conversion, more preferably at a point corresponding to about 5% to about 25% conversion, and even more preferably at a point corresponding to about 5% to about 15% conversion, of the (meth)acrylate monomer based on molar weight of the monomer. The point at which the polymerization reaction is halted typically corresponds to the desired viscosity of the (meth)acrylate syrup formed during this stage.

According to the method of the invention, (meth)acrylate syrup comprising a coatable viscosity is formed. In order to form a cohesive coating, syrups generally must have a sufficiently high viscosity. Yet, it is also important that the syrup have a low enough viscosity so that it can readily flow onto a substrate upon coating. Generally, syrups according to the invention have a Brookfield viscosity of about 0.2 Pascal-second (200 centipoise) to about 10 Pascal-seconds (10,000 centipoise) when measured at room temperature. A composition's Brookfield viscosity is measurable using equipment and according to methodology known to those of ordinary skill in the art. For example, a rotational viscometer such as those available from Cole-Parmer (Vernon Hills, Ill.) can be used to measure a composition's Brookfield viscosity.

In one embodiment, the syrup has a Brookfield viscosity of about 5 Pascal-seconds (5,000 centipoise) or less when measured at room temperature. In another embodiment, the syrup has a Brookfield viscosity of about 4 Pascal-seconds (4,000 centipoise) or less when measured at room temperature. For example, syrups according to the invention can have a Brookfield viscosity of about 0.5 Pascal-second (500 centipoise) to about 5 Pascal-seconds (5,000 centipoise) when measured at room temperature. As yet another example, syrups according to the invention can have a Brookfield viscosity of about 1 Pascal-second (1,000 centipoise) to about 3 Pascal-seconds (3,000 centipoise) when measured at room temperature.

Partial polymerization of the purified (meth)acrylate monomer to form the syrup can be effected using any suitable mechanism. Any desired or required polymerization initiators associated with the mechanism can be introduced prior to or during the stage of partial polymerization in order to effectuate the desired polymerization. Preferably, polymerization initiators are combined with the (meth)acrylate monomer prior to the stage of partial polymerization or at least prior to the point where the monomer is heated to the maximum reaction temperature during the stage of partial polymerization. According to this embodiment, after being combined, the combination of polymerization initiator and monomer is progressively heated to the maximum reaction temperature. In an exemplary embodiment, essentially all of the polymerization initiator is consumed by the time the maximum reaction temperature is reached.

According to one exemplary mechanism, partial polymerization proceeds via free radical polymerization. Any suitable free radical initiator or combinations thereof can be used to effectuate such partial polymerization. As the composition comprising (meth)acrylate monomer and any free radical polymerization initiator or combinations thereof is heated to its maximum reaction temperature, free radicals are progressively generated upon decomposition of the free radical polymerization initiator. The exothermic free radical polymerization reaction is, thus, able to proceed progressively in this embodiment. In addition to the safety benefits realized by the more efficient heat transfer across the reactor, progressive free radical generation facilitates formation of a (meth)acrylate syrup—and resulting polymer—having a relatively broad range of polydispersity (i.e., molecular weight distribution). Particularly when forming (meth)acrylate-based adhesives, a broad range of polydispersity facilitates formation of often-desired pressure sensitive adhesive properties.

Preferably, at least one free radical polymerization initiator has a relatively low temperature half-life and minimized toxicity issues. Further, it is preferred that any free radical polymerization initiator used does not employ additional functionality beyond that necessary for generation of free radicals, where such additional functionality operates to otherwise incorporate the free radical polymerization initiator into the polymerization product (e.g., functioning as a crosslinking agent, which is not always desirable). In an exemplary embodiment, continuously polymerizing the (meth)acrylate monomer to a syrup comprises using a free radical polymerization initiator having a half life of about ten hours or less at a use temperature of about 70° C., preferably about 50° C. or less. In a further exemplary embodiment, the free radical polymerization initiator has a half life of about ten hours or less at a use temperature of about 30° C. or less.

Exemplary free radical polymerization initiator chemistries include those based on peroxide or azo chemistries. Exemplary peroxide-based polymerization initiators include both aromatic-type and alkyl-type peroxides. Preferably, alkyl-type peroxides are used when the polymerization initiator is based on peroxide chemistry.

From the standpoint that they have a tendency to become incorporated into the growing polymer via additional functionality beyond that necessary for generation of free radicals and/or produce toxic by-products (e.g., tetramethylsuccinonitrile (TMSN)) when free radicals are generated therefrom, free radical polymerization initiators based on azo chemistry are generally not as preferred as polymerization initiators based on peroxide chemistry. However, azo-based free radical polymerization initiators have other benefits. One of those benefits is that some azo-based polymerization initiators have relatively low temperature half-lives associated therewith. This is advantageous from the standpoint that it helps promote stability of the (meth)acrylate syrup once formed, given that essentially all of the free radical polymerization initiator is consumed by that point in time. Further, this is also advantageous from the standpoint that lower maximum reaction temperatures can be efficiently used during the stage of partial polymerization.

In one embodiment of the invention, an effective amount of at least one free radical polymerization initiator is mixed with at least one (meth)acrylate monomer formed according to methods of the invention. In an exemplary embodiment, about 1 ppm to about 50 ppm (about 0.0001% to about 0.0050% based on total weight of the (meth)acrylate monomer) of polymerization initiator is used. By using a relatively small amount of a free radical polymerization initiator, better control of the reaction is maintained. For example, safety is improved by minimizing the risk of an uncontrolled and highly exothermic reaction fed by excess free radical polymerization initiator. Further, it is preferable that all polymerization initiator be consumed once the (meth)acrylate syrup is formed so as to promote its storage stability. Thus, use of excess polymerization initiator for any purpose other than to de-activate any polymerization inhibitors present in the system is generally not desirable. Nevertheless, the amount of free radical polymerization initiator used impacts viscosity of the resulting (meth)acrylate syrup. More polymerization initiator is used when a (meth)acrylate syrup having a higher viscosity is desired and vice versa.

An exemplary free radical polymerization initiator is V-70. V-70 is an azo-based initiator having a ten-hour half life temperature of 30° C. available from Wako Chemicals USA, Inc. (Richmond, Va.). Using such a polymerization initiator, efficient formation and storage stability of the (meth)acrylate syrup is optimized. In an exemplary embodiment, when forming an iso-octyl acrylate syrup using V-70 as a free radical polymerization initiator, employing about 27 ppm V-70 based on total weight of iso-octyl acrylate monomer generally results in an iso-octyl acrylate syrup having a viscosity of about 2.5 Pascal-seconds (2,500 centipoise).

Preferably the stage of partial polymerization proceeds in an essentially solvent-free manner. Advantageously, the absence of solvents (i.e., both organic solvents and water) allows smaller and less costly reaction equipment to be used for that stage. In contrast, as discussed in the background of the invention above, safety mandates that relatively large and specially designed reaction equipment be utilized for conventional solvent-based batch polymerization in order to accommodate the large reaction exotherm and solvents. The solvents must also then be removed, which negatively impacts process efficiency.

As compared to batch polymerization techniques, continuous methods according to the invention enable efficient formation of (meth)acrylate syrup by exposing only a relatively small volume of material at a time to reaction conditions within a reactor during the stage of partial polymerization. This relatively short and low volume reaction advantageously enables a more controlled reaction product and safer reaction conditions, particularly in view of the highly exothermic nature of the free radically initiated (meth)acrylate polymerization reaction.

For example, during the stage of partial polymerization, residence time within a heated portion of the polymerization reactor is reduced. In an exemplary embodiment, residence time within a heated portion of the polymerization reactor is less than about thirty minutes, preferably less than about five minutes.

As another example, during the stage of partial polymerization, a relatively low volume of material is present within the heated portion of the polymerization reactor at any given time. For example, less than about 10% of continuous volumetric throughput will be present within the heated portion of the polymerization reactor at any given time. Preferably less than about 3%, more preferably less than about 0.5%, of continuous volumetric throughput will be present within the heated portion of the polymerization reactor at any given time. These percentages of continuous volumetric throughput are calculated by dividing volume of the heated portion of the polymerization reactor by volumetric throughput associated with the reactor.

Any suitable equipment can be used for the polymerization reactor used to form the syrup. For example, a polymerization reactor described further in co-pending U.S. patent application Ser. No. 12/264,576, entitled "Apparatus for Continuous Production of Partially Polymerized Compositions" and filed on the same date herewith, can be used. In one embodiment the polymerization reactor comprises at least a plug flow reactor and a tubing network within a heat transfer medium. The tubing comprises any suitable material (e.g., stainless steel tubing). No matter what type of tubing is used, preferably the tubing has a relatively large ratio of surface area to volume. In an exemplary embodiment, about 300-460 centimeters (10-15 feet) of tubing having a radius of about 0.6-2.5 centimeters (0.25-1 inch) is employed. Preferably, ratio of surface area to volume is at least about 0.8/cm (2/inch), more preferably at least about 2.4/cm (6/inch), even more preferably at least about 3.2/cm (8/inch), and most preferably at least about 6.3/cm (16/inch). This relatively large ratio of surface area to volume, as well as use of a heat transfer medium described further below, facilitates optimal thermal management. To optimize efficiency of space, the reactor comprises a compressed (e.g., coiled, wound, folded, or otherwise non-linearly positioned) tubing network within a heat transfer medium.

To further promote optimal thermal management, the tubing network within the reactor is preferably oriented within a heat transfer medium (i.e., the heated portion) capable of both supplying heat for the reaction and, for safety reasons, effectively dissipating any excess heat resulting from the exothermic reaction in the case of a runaway reaction. Exemplary heat transfer mediums include mineral oil and other hydrocarbon oils, as well as other suitable materials known to those of ordinary skill in the art. The type and amount of such heat transfer medium is selected to facilitate the supply of heat needed to partially polymerize the (meth)acrylate monomer to a syrup therefrom. In an exemplary embodiment, the amount of thermal energy required to heat a predetermined amount of (meth)acrylate monomer to the maximum reaction temperature exceeds the amount of thermal energy released by that amount of material during the exothermic reaction resulting in forming the (meth)acrylate syrup. Thus, unlike conventional methodology, removing heat created by the exothermic reaction is not a significant and ongoing concern when practicing methods of the present invention.

While not necessary according to preferred embodiments of the invention, the polymerization reactor can optionally include other components, such as for example, apparatus for internal mixing of the reaction mixture. For example, static inline mixers and/or other mixing apparatus known to those of ordinary skill in the art can be placed within the tubing network. As this placement tends to decrease the ratio of the tubing network's surface area to volume, however, mixing external to the reactor is often preferable when mixing is desired or required.

Methods of polymerization, partial or otherwise, according to the invention are preferably essentially solvent-free as defined above. Some solvent, however, such as that used to introduce the catalyst when preparing the (meth)acrylate monomer, might be present. Nevertheless, costly and complicated reaction equipment and post-polymerization processing steps can be avoided by eliminating or substantially reducing the amount of solvent used.

Further contributing to improved safety and processing efficiency is the fact that (meth)acrylate monomer used in the invention has an atmospheric boiling temperature of at least about 140° C., preferably at least about 200° C., as discussed above. Thus, elevated pressure (i.e., pressure greater than approximately atmospheric pressure) is generally not necessary to efficiently react the (meth)acrylate monomer during the stage of partial polymerization. A pressure gradient is typically used, however, merely to move the reaction mixture through the reaction equipment. The maximum pressure within this pressure gradient is preferably no more than that provided by the equipment used to move the reaction mixture therethrough. In any event, preferably, the maximum pressure during the stage of partial polymerization is about 5 MPa.

Similarly, highly elevated temperature is also not necessary to efficiently react the (meth)acrylate monomer during the stage of partial polymerization. In an exemplary embodiment, the stage of continuously polymerizing the (meth)acrylate monomer to a syrup therefrom is capable of efficiently proceeding at temperatures of about 150° C. or less. In a further embodiment, the stage of continuously polymerizing the (meth)acrylate monomer to a syrup therefrom is capable of efficiently proceeding at temperatures of about 120° C. or less. Polymerization to a syrup can occur at a temperature as low as the decomposition or activation temperature of any polymerization initiator used to react the (meth)acrylate monomer. However, elevating the reaction temperature to a point above the decomposition or activation temperature promotes a more rapid reaction. Temperature is adjusted accordingly. In any event, it is preferred that the maximum reaction temperature is less than the atmospheric boiling point of (meth)acrylate monomer being polymerized to a syrup by at least about 30° C., more preferably by at least about 50° C.

Once the (meth)acrylate syrup is formed, it can be stored for later processing or continuously supplied to further processing equipment for additional continuous processing. When stored for later use, storage stability is often enhanced by bringing the syrup to approximately room temperature (i.e., about 22° C. to about 25° C.) and exposing the syrup to oxygen in the atmosphere when polymerization inhibitors are present therein. Exposure of the (meth)acrylate syrup to atmospheric oxygen, operates to activate polymerization inhibitors such as those based on quinone chemistry (e.g., mono ether hydroquinone), which again are often present in the (meth)acrylate product due to their origin in most commercially available (meth)acrylic acid used to form the (meth)acrylate monomer precursor thereof.

Any suitable equipment and methodology can be used to store the (meth)acrylate syrup as desired. For example, the reactor or downstream processing equipment can contain additional tubing positioned within a cooling medium (e.g., chilled water bath) to efficiently cool the (meth)acrylate syrup to approximately room temperature. Preferably, a relatively large ratio of surface area to volume is achieved by the use of tubing for the cooling stage as well as within the heated portion of the reactor. While not necessary according to preferred embodiments of the invention, apparatus, such as that for internal mixing of the (meth)acrylate syrup, can optionally be placed within the tubing positioned within the cooling medium as with the tubing positioned within the heat transfer medium. In an exemplary embodiment, the tubing positioned within a cooling medium is of the same type and of approximately the same dimensions as the tubing network positioned within the heat transfer medium. This facilitates relatively simple and efficient cooling of the (meth)acrylate syrup.

FIG. 1 schematically illustrates exemplary processing steps and associated processing equipment including the stage of partial polymerization of (meth)acrylate monomer to a syrup. As shown therein, (meth)acrylate monomer 102 and polymerization initiator 104 are fed through respective meter mixers 106 and 108 for partial polymerization. Optionally, the mixture 110 of (meth)acrylate monomer 102 and polymerization initiator 104 is mixed using a static in-line mixer. Thereafter, the mixture 110 proceeds through a vessel 112 where the effects of any polymerization inhibitors present are deactivated, when necessary, before being fed through meter mixer 114 and into a polymerization reactor. The polymerization reactor includes a heating portion 116 and a cooling portion 118. Once partially polymerized in the polymerization reactor, syrup 120 is obtained according to the invention. The syrup 120 can then be stored for later processing into an adhesive or it can proceed into equipment for further continuous processing into an adhesive, as desired.

Any suitable equipment and methodology can also be used when continuously supplying the (meth)acrylate syrup to equipment for further processing. Due to the homogeneity of the polymeric backbone in (meth)acrylate syrup prepared according to the invention, it is capable of being formulated into an infinite number of compositions with properties tailored to the desired end use application.

According to a further exemplary embodiment, the (meth)acrylate syrup is mixed with other components to form an adhesive therefrom. Adhesive formulation is well known to those of ordinary skill in the art. (Meth)acrylate syrup of the invention can be used to make any suitable adhesive. For example, the (meth)acrylate syrup can be meter mixed with (meth)acrylic acid, a suitable catalyst, and any adhesive additives (e.g., tackifiers, crosslinkers, et cetera) desired. One preferred embodiment comprises mixing the (meth)acrylate syrup (e.g., iso-octyl acrylate syrup) with acrylic acid in a weight ratio of about 95:5 to about 85:15. A multitude of different adhesives can be easily formulated in web-polymerized technologies without constraints often associated with solvent-based or hot-melt chemistries. Methods of the invention facilitate efficient formulation and processing of such web-polymerized adhesives. For example, after sufficient mixing, the mixture can be continuously coated onto a substrate (e.g., a moving web) to form an adhesive film of the desired thickness and other properties as known to those of ordinary skill in the art.

In one embodiment, the (meth)acrylate syrup is mixed with an ultraviolet curing agent (i.e., photoinitiator) and then coated onto a moving web at which time the coating is exposed to ultraviolet radiation to cure the composition. Such coating and curing is known to those of ordinary skill in the art. For example, U.S. Pat. Nos. 4,181,752; 4,303,485; 4,379,201; and 4,421,822 discuss such methodology. Typically, ultraviolet radiation having a wavelength of about 300-400 nanometers and a surface intensity of about 0.1 mW/cm$^2$ to about 7.0 mW/m$^2$ is used to cure the adhesive when pressure sensitive adhesive properties are desired. Preferably, the ultraviolet curing agent does not contain polymerizable groups such that it would become incorporated into the composition upon polymerization or further processing. Exemplary ultraviolet curing agents include polymerization photoinitiators such as IRGACURE 819, a bis-acyl-phosphine oxide photoinitiator with a maximum absorption in the range of about 360-390 nanometers available from Ciba Specialty Chemicals Inc. of Tarrytown, N.Y. and ESACURE ONE, a polymeric alpha-hydroxyketone photoinitiator available from Lamberti S.p.A. Chemical Specialties of Italy. When desired, an exemplary crosslinker comprises CN 303, polybutadiene dimethacrylate, available from Sartomer Company, Inc. of Exton, Pa.

Exemplary embodiments and applications of the invention are described in the following non-limiting examples.

EXAMPLES

Example 1

Figure 2:
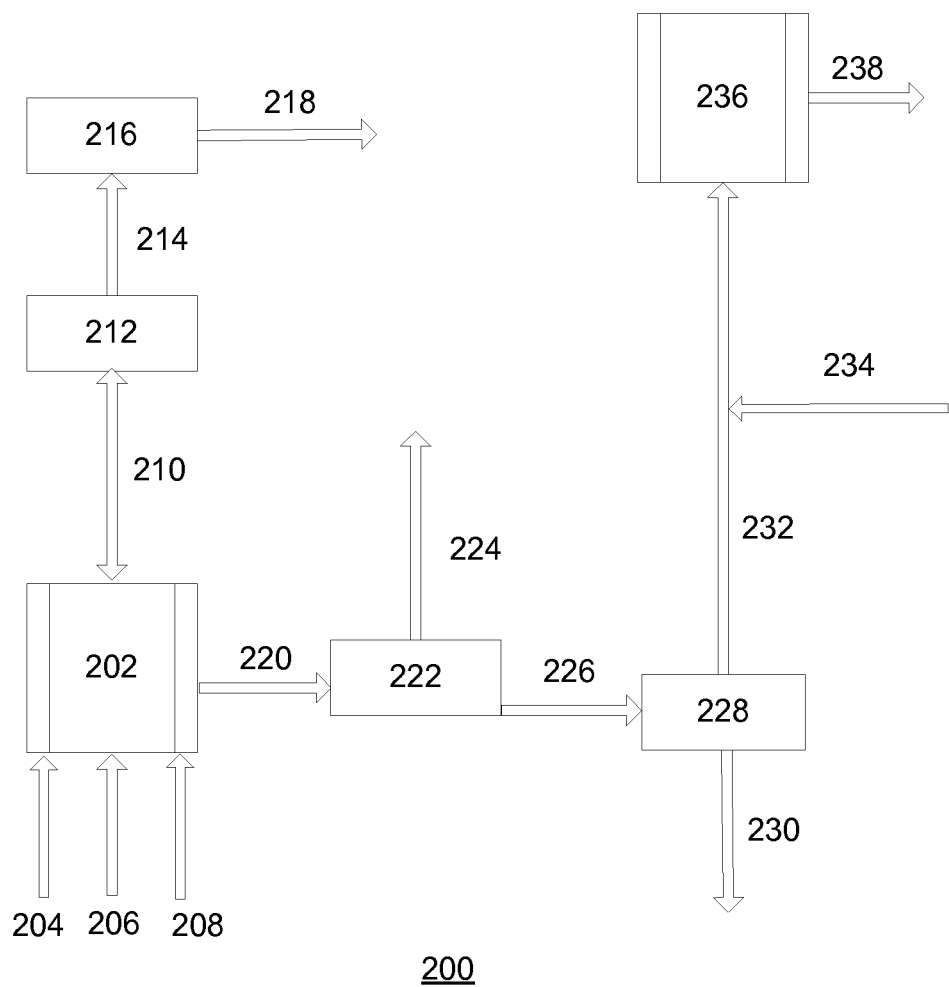
FIG. 2 is a schematic representation of a method of the invention for continuous preparation of (meth)acrylate syrup.

With reference to FIG. 2, a flow diagram 200 exemplifying a method of the invention for continuous preparation of (meth)acrylate syrup is illustrated. A first reactor 202 is continuously supplied with acrylic acid and iso-octanol via conduits 204 and 206, respectively, in a proportion such that iso-octanol is supplied in a molar excess of about 1.1:1 to about 2:1 to that of the acrylic acid. Sulfuric acid is added to the reactants via conduit 208 in an amount such that it is present in about 0.5 weight % to about 5 weight % of the total reactant mixture.

The reactant mixture is continuously mixed while present in the first reactor 202 operating at a reduced pressure of about 50 mmHg to about 250 mmHg. The first reactor 202 (i.e., an esterification reactor) is maintained at a temperature of about 70° C. to about 135° C. as an esterification reaction leads to monomer formation. During this stage, water by-product from formation of monomer passes via conduit 210 through a partial condenser 212 in the gas phase. Thereafter, it passes via conduit 214 through a total condenser 216 before being removed from the process via conduit 218. All other reactants (i.e., acrylic acid, iso-octanol, and/or sulfuric acid) are allowed to condense and re-enter the reaction mixture via conduit 210.

After sufficient time has passed, effluent from the first reactor 202 is pumped via conduit 220 into a first distillation column 222. The first distillation column 222 operates at a reflux ratio of about 0.5-5.0. Within the first distillation column 222, iso-octanol and acrylic acid are distilled off the top via conduit 224 using a reduced pressure of about 50 mmHg to about 150 mmHg and at a temperature of about 80° C. to about 150° C. These reactants are then recycled back for use in the first reactor 202. Iso-octyl acrylate and other components (e.g., any polymerized material, di-iso-octyl ether, catalyst, or reaction by-products containing the catalyst) are removed from the base of the first distillation column 222 via conduit 226 and pumped to a second distillation column 228.

The second distillation column 228 operates at a reflux ratio of about 0.1-3.0. Within the second distillation column 228, iso-octyl acrylate is distilled off the top via conduit 232 using a reduced pressure of about 10 mmHg to about 120 mmHg and at a temperature of about 100° C. to about 150° C. The iso-octyl acrylate is then condensed into a liquid phase and brought to atmospheric pressure and a temperature of about 25° C. to about 100° C.

Once liquified, the iso-octyl acrylate is mixed, in-line, with a free radical polymerization initiator. The free radical polymerization initiator is added via conduit 234 at a relatively low temperature (i.e., below about 70° C.). The free radical polymerization initiator preferably has a ten-hour half-life below about 70° C. Exemplary free radical polymerization initiators include those of azo-type or peroxide-type chemistries. The free radical polymerization initiator is mixed with the iso-octyl acrylate in an amount to maintain a concentration of free radical polymerization initiator in iso-octyl acrylate of about 10 ppm to about 50 ppm.

The mixture of iso-octyl acrylate and free radical polymerization initiator is then routed into a second reactor 236 to partially polymerize the iso-octyl acrylate. The second reactor 236 is maintained at a temperature of about 70° C. to about 120° C. After conversion of about 5% to about 50% of the iso-octyl acrylate, the reaction is suspended by cooling the mixture to about room temperature and exposing the mixture to the atmosphere while exiting the second reactor 236 via conduit 238.

Example 2

A pilot glass reactor, such as those sold using product designation "PRG-7010-01" from Prism Research Glass (Raleigh, N.C.), having a capacity of 15 liters was jacketed and heated using mineral oil to 100° C. and an operating pressure of 100 mmHg. The first glass reactor was continuously supplied with acrylic acid at a rate of 216 grams per hour (g/hr) (3 moles per hour). Simultaneously, iso-octanol was continuously supplied to the first glass reactor at a rate of 455 g/hr (3.5 moles per hour). Sulfuric acid was continuously supplied to the first glass reactor at a rate of 13.7 g/hr (0.14 moles per hour) to maintain a concentration of sulfuric acid in the reactor of 2% of the total weight.

The reaction was allowed to proceed for three hours before material began to be drawn from the reactor. During this time, water by-product from formation of monomer passed through a partial condenser (maintained at a pressure of 100 mmHg and a temperature of 80° C.) and then a total condenser (maintained at a temperature of 25° C.) before being removed from the process. All other reactants (i.e., acrylic acid, iso-octanol, and/or sulfuric acid) were allowed to condense and re-enter the reaction mixture via a conduit. During the three-hour reaction time period, a total of 169 grams of water and iso-octanol was collected.

At the end of the three-hour reaction time period, effluent from the reactor was pumped at a rate of 589 g/hr into a first distillation column via a conduit. Within the first distillation column, iso-octanol and acrylic acid were distilled off the top of the first distillation column using a reduced pressure of 98 mmHg and a temperature of 138° C. These reactants were then transported back to the first reactor at a rate of 47 g/hr. Iso-octyl acrylate and heavy products (e.g., any polymerized material or di-iso-octyl ether) were removed from the base of the first distillation column and pumped to a second distillation column at a rate of 507 g/hr via a conduit.

Within the second distillation column, iso-octyl acrylate was distilled off the top (at a pressure of 2.7 kPa (20 mmHg) and at a temperature of 150° C.). The iso-octyl acrylate was then condensed into a liquid phase and brought to atmospheric pressure and a temperature of 103° C.

Once liquified, the iso-octyl acrylate was mixed, in-line, with V-70, an azo free radical polymerization initiator having a ten-hour half life temperature of 30° C., available from Wako Chemicals USA, Inc. (Richmond, Va.), resulting in an iso-octyl acrylate solution containing 0.05% by weight free radical polymerization initiator. The mixture of iso-octyl acrylate and free radical polymerization initiator was then routed at a rate of 27 g/hr into a second reactor to partially polymerize the iso-octyl acrylate.

The second reactor was maintained at a temperature of 110° C. The second reactor comprised a first 3.7-meter (12-foot) length of coiled stainless steel tubing having an inside diameter of 6.4 mm (0.25 inch) and a wall thickness of 0.5 mm (0.02 inch). The first length of coiled tubing was immersed in mineral oil maintained at a temperature of 110° C. After passing through the first length of heated tubing, the iso-octyl acrylate syrup passed into a second 3.7-meter (12-foot) length of coiled stainless steel tubing also having an inside diameter of 6.4 mm (0.25 inch) and a wall thickness of 0.5 mm (0.02 inch). The second 3.7-meter (12-foot) length of coiled tubing was maintained at a temperature of 10° C. by its placement within a circulated water bath maintained at that temperature. After conversion of 12% of the iso-octyl acrylate to 4 Pascal-seconds (4,000 centipoise) iso-octyl acrylate syrup, the reaction was suspended by cooling the mixture to 22° C. and exposing the mixture to the atmosphere.

Example 3

(Meth)acrylate syrup prepared according to a method of the invention described in Example 2 was mixed with acrylic acid in a weight ratio of 90:10. To this mixture was added about 0.5-2.0% by weight photoinitiator (IRGACURE 819, a bis-acyl-phosphine oxide photoinitiator with a maximum absorption in the range of about 360-390 nanometers available from Ciba Specialty Chemicals Inc. of Tarrytown, N.Y.), and about 0-1.2% by weight stannous octoate catalyst, based on total syrup weight. The mixture was coated onto a 50 μm-thick (2 mil-thick) polyethylene terephthalate substrate to a thickness of about 25-50 μm (1-2 mils) and laminated with a transparent 75 μm-thick (3 mil-thick) polyethylene terephthalate release to form a transfer tape enclosed within an inert environment. The laminated sample was then placed about 8-18 cm (3-7 inches) away from a bank of BLB bulbs having a maximum spectral output of about 354 nanometers (e.g., such as F8T5 ultraviolet bulbs available from commercial sources such as McMaster-Carr of Princeton, N.J.) and irradiated from about 45 seconds to about 3 minutes to form a pressure sensitive adhesive.

Various modifications and alterations of the invention will become apparent to those skilled in the art without departing from the spirit and scope of the invention, which is defined by the accompanying claims. For example, the presence of minor interruptions (for example, in time or space) in a process does not necessarily render the process discontinuous and outside the scope of the present claims. It should also be noted that steps and stages recited in any method claims below do not necessarily need to be performed in the order that they are recited. Those of ordinary skill in the art will recognize variations in performing the steps and stages from the order in which they are recited. In addition, the lack of mention or discussion of a feature, step, stage, or component provides the basis for claims where the absent feature or component is excluded by way of a proviso or similar claim language.

Further, as used throughout, ranges may be used as shorthand for describing each and every value that is within the range. Any value within the range can be selected as the terminus of the range. Similarly, any discrete value within the range can be selected as the minimum or maximum value recited in describing and claiming features of the invention.

In addition, as discussed herein it is again noted that the compositions described herein may comprise all components in one or multiple parts. Other variations are recognizable to those of ordinary skill in the art.

The invention claimed is:

1. A method of preparing a (meth)acrylate syrup comprising:
   providing one or more precursors for formation of (meth)acrylate monomer;
   continuously forming the (meth)acrylate monomer from the one or more precursors thereof;
   continuously polymerizing at least the (meth)acrylate monomer to form the (meth)acrylate syrup; and
   halting polymerization once the (meth)acrylate syrup is formed,
   wherein the method is a continuous process that is essentially uninterrupted in time and space from a beginning reference point preceding formation of the (meth)acrylate monomer to an ending reference point that is no earlier in the process than a point at which the (meth)acrylate syrup is formed therefrom,
   wherein the (meth)acrylate syrup is formed using a reactor for formation of the (meth)acrylate monomer coupled to a polymerization reactor for continuously receiving the (meth)acrylate monomer from the reactor in which it is formed and partially polymerizing the (meth)acrylate monomer to form the (meth)acrylate syrup by exposing on a portion of the (meth)acrylate monomer at a time to reaction conditions within the polymerization reactor, and
   wherein continuously polymerizing at least the (meth)acrylate monomer occurs within a tubing network within a heat transfer medium and heat is continuously supplied from the heat transfer medium to the polymerization reactor during steady state operation of the polymerization reactor.

2. The method of claim 1, wherein continuously forming the (meth)acrylate monomer comprises reacting a (meth)acryloyl chloride and its corresponding oxo alcohol.

3. The method of claim 1, wherein continuously forming the (meth)acrylate monomer comprises esterification of (meth)acrylic acid and its corresponding oxo alcohol.

4. The method of claim 3, wherein the oxo alcohol comprises a chain of at least six carbon atoms.

5. The method of claim 3, wherein the esterification occurs at an elevated temperature in the presence of at least one organic sulfonic acid catalyst.

6. The method of claim 1, wherein the (meth)acrylate monomer has an atmospheric boiling temperature of at least about 140° C.

7. The method of claim 1, further comprising optionally purifying the (meth)acrylate monomer after its formation and prior to polymerization thereof.

8. The method of claim 1, wherein continuously polymerizing at least the (meth)acrylate monomer to form the (meth)acrylate syrup comprises polymerizing at least one continuously formed (meth)acrylate monomer and at least one other type of monomer.

9. The method of claim 1, wherein continuous polymerization of at least the (meth)acrylate monomer is halted prior to near complete conversion of the (meth)acrylate monomer.

10. The method of claim 1, wherein continuous polymerization of at least the (meth)acrylate monomer is halted at a point corresponding to about 5% to about 15% conversion of the (meth)acrylate monomer.

11. The method of claim 1, wherein continuously polymerizing at least the (meth)acrylate monomer is an essentially solvent-free process.

12. The method of claim 1, wherein continuous polymerization of at least the (meth)acrylate monomer is capable of efficiently proceeding at temperatures of less than about 150° C.

13. The method of claim 1, wherein continuously polymerizing at least the (meth)acrylate monomer occurs wherein the continuous polymerization reaction temperature is less than atmospheric boiling point of the (meth)acrylate monomer being polymerized to a syrup by at least about 30° C.

14. The method of claim 1, wherein continuously polymerizing at least the (meth)acrylate monomer occurs wherein the continuous polymerization reaction temperature is less than atmospheric boiling point of the (meth)acrylate monomer being polymerized to a syrup by at least about 50° C.

15. The method of claim 1, wherein continuously polymerizing at least the (meth)acrylate monomer comprises using a polymerization initiator having a half life of about ten hours or less at a use temperature of about 70° C. or less.

16. The method of claim 1, wherein continuously polymerizing at least the (meth)acrylate monomer occurs within a heated portion of the polymerization reactor and with a residence time therein of less than about thirty minutes.

17. The method of claim 1, wherein continuously polymerizing at least the (meth)acrylate monomer occurs within a heated portion of the polymerization reactor and with a residence time therein of less than about five minutes.

18. The method of claim 1, wherein continuously polymerizing at least the (meth)acrylate monomer occurs within a heated portion of the polymerization reactor and wherein less than about 10% of continuous volumetric throughput is present within the heated portion of the polymerization reactor at any given time.

19. The method of claim 1, wherein the method is performed in a polymerization system closed to atmospheric air.

20. The method of claim 19, further comprising purging oxygen from the system prior to or while continuously polymerizing at least the (meth)acrylate monomer to form the (meth)acrylate syrup.

21. The method of claim 19, further comprising a step of exposing the (meth)acrylate syrup to atmospheric oxygen to activate any polymerization inhibitors that are present.

22. The method of claim 19, further comprising a step of adding at least one polymerization inhibitor to the (meth)acrylate syrup once the (meth)acrylate syrup is formed.

23. The method of claim 1, wherein the tubing network is a compressed tubing network.

24. The method of claim 1, wherein the (meth)acrylate syrup formed is storage stable.

25. The method of claim 1, wherein the (meth)acrylate syrup has a Brookfield viscosity of about 0.2 Pascal-second to about 10 Pascal-seconds when measured at room temperature.

26. The method of claim 1, wherein the (meth)acrylate syrup has a Brookfield viscosity of about 0.5 Pascal-second to about 5 Pascal-seconds when measured at room temperature.

27. The method of claim 1, wherein the (meth)acrylate syrup has a Brookfield viscosity of about 1 Pascal-second to about 3 Pascal-seconds when measured at room temperature.

28. The method of claim 1, wherein the (meth)acrylate syrup has a range of polydispersity.

29. The method of claim 1, further comprising a step of bringing the (meth)acrylate syrup to approximately room temperature.

30. The method of claim 1, wherein the step of continuously polymerizing at least the (meth)acrylate monomer to form the (meth)acrylate syrup comprises progressively heating the (meth)acrylate monomer.

31. The method of claim 1, wherein the (meth)acrylate syrup is continuously supplied to further processing equipment.

32. A method of preparing an adhesive film, comprising:
   preparing a (meth)acrylate syrup according to the method of claim 1;
   continuously coating a composition comprising the (meth)acrylate syrup onto a substrate; and
   polymerizing the composition comprising the (meth)acrylate syrup to form the adhesive film.

33. The method of claim 32, wherein polymerizing the composition comprises free radical polymerization.

* * * * *

UNITED STATES PATENT AND TRADEMARK OFFICE
CERTIFICATE OF CORRECTION

| | | |
|---|---|---|
| PATENT NO. | : 8,765,217 B2 | Page 1 of 1 |
| APPLICATION NO. | : 12/264602 | |
| DATED | : July 1, 2014 | |
| INVENTOR(S) | : James E. McGuire, Jr. et al. | |

It is certified that error appears in the above-identified patent and that said Letters Patent is hereby corrected as shown below:

Please replace the assignee Item 73 on the title page of the patent with the following:
--entrochem, inc., Columbus, OH (US)--

Signed and Sealed this
Sixteenth Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,765,217 B2
APPLICATION NO. : 12/264602
DATED : July 1, 2014
INVENTOR(S) : James E. McGuire, Jr.

It is certified that error appears in the above-identified patent and that said Letters Patent is hereby corrected as shown below:

In the Claims

Please replace "on" with --only-- in such that Column 15, lines 23-53, claim 1 should read:

--1. A method of preparing a (meth)acrylate syrup comprising:
   providing one or more precursors for formation of (meth)acrylate monomer;
   continuously forming the (meth)acrylate monomer from the one or more precursors thereof;
   continuously polymerizing at least the (meth)acrylate monomer to form the (meth)acrylate syrup; and
   halting polymerization once the (meth)acrylate syrup is formed,
wherein the method is a continuous process that is essentially uninterrupted in time and space from a beginning reference point preceding formation of the (meth)acrylate monomer to an ending reference point that is no earlier in the process than a point at which the (meth)acrylate syrup is formed therefrom,
wherein the (meth)acrylate syrup is formed using a reactor for formation of the (meth)acrylate monomer coupled to a polymerization reactor for continuously receiving the (meth)acrylate monomer from the reactor in which it is formed and partially polymerizing the (meth)acrylate monomer to form the (meth)acrylate syrup by exposing only a portion of the (meth)acrylate monomer at a time to reaction conditions within the polymerization reactor, and
wherein continuously polymerizing at least the (meth)acrylate monomer occurs within a tubing network within a heat transfer medium and heat is continuously supplied from the heat transfer medium to the polymerization reactor during steady state operation of the polymerization reactor.--

Signed and Sealed this
Seventh Day of October, 2014

Michelle K. Lee
*Deputy Director of the United States Patent and Trademark Office*